United States Patent
Ahmed

(10) Patent No.: US 11,643,027 B2
(45) Date of Patent: May 9, 2023

(54) RETAINERS FOR ELONGATED MEMBERS IN VEHICLES

(71) Applicant: Nissan North America, Inc., Franklin, TN (US)

(72) Inventor: Mahiuddin Ahmed, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 60 days.

(21) Appl. No.: 16/857,474

(22) Filed: Apr. 24, 2020

(65) Prior Publication Data

US 2021/0331631 A1 Oct. 28, 2021

(51) Int. Cl.
*B60R 16/02* (2006.01)
*F16B 2/04* (2006.01)

(52) U.S. Cl.
CPC ............ *B60R 16/0215* (2013.01); *F16B 2/04* (2013.01)

(58) Field of Classification Search
CPC ...... B60R 16/0215; F16B 2/04; F16B 7/0433; F16B 5/0685; F16B 2/22; F16L 3/22; F16L 3/221; F16L 3/222; F16L 3/223; F16L 3/237
See application file for complete search history.

(56) References Cited

U.S. PATENT DOCUMENTS

| | | | |
|---|---|---|---|
| 3,894,706 A | 7/1975 | Mizusawa | |
| 4,691,883 A | 9/1987 | Kurihara | |
| 4,881,705 A | 11/1989 | Kraus | |
| 5,190,251 A | 3/1993 | Bodo | |
| 6,641,093 B2 | 11/2003 | Coudrais | |
| 7,119,280 B1 * | 10/2006 | Ray | H02G 3/18 174/72 A |

(Continued)

FOREIGN PATENT DOCUMENTS

| | | | |
|---|---|---|---|
| CN | 113561912 A | * | 10/2021 |
| DE | 102019107104 A1 | * | 1/2006 |

(Continued)

OTHER PUBLICATIONS

ARaymond industrial product catalog 2016 (Year: 2016).*

(Continued)

*Primary Examiner* — Terrell L McKinnon
*Assistant Examiner* — Ding Y Tan
(74) *Attorney, Agent, or Firm* — Young Basile Hanlon & MacFarlane, P.C.

(57) ABSTRACT

A retainer is disclosed that is configured to receive at least one elongated member in a vehicle. The retainer includes a body and first and second receptacles that are supported by the body. The first receptacle defines a first channel that is configured to receive a first elongated member (e.g., a cable, a wire, a rod, etc.) and includes a first finger that extends towards the second receptacle. The second receptacle defines a second channel that is configured to receive a second elongated member (e.g., a cable, a wire, a rod, etc.) and includes a second finger that extends towards the first receptacle. In certain embodiments, the first finger and the second finger may be formed as discrete structures so as not to interfere with flexure of the first receptacle and the second receptacle during insertion and removal of the first elongated member and the second elongated member.

20 Claims, 6 Drawing Sheets

(56) References Cited

U.S. PATENT DOCUMENTS

| | | | | |
|---|---|---|---|---|
| 7,278,190 | B2* | 10/2007 | Fischer | F16L 3/223 248/74.2 |
| 7,294,789 | B1* | 11/2007 | Watthanasintham | B60R 16/0215 174/135 |
| 7,758,197 | B2 | 7/2010 | Choi et al. | |
| 8,668,174 | B2* | 3/2014 | Kato | F16L 3/222 24/339 |
| 9,273,804 | B2* | 3/2016 | Shinoda | F16L 3/13 |
| 11,512,797 | B2* | 11/2022 | Kanie | H02G 3/32 |
| 2004/0056158 | A1* | 3/2004 | Stuart | F16L 3/13 248/74.2 |
| 2005/0001108 | A1* | 1/2005 | Stigler | F16L 3/223 248/68.1 |
| 2010/0258685 | A1* | 10/2010 | Gardner | F16L 3/13 248/68.1 |
| 2020/0265973 | A1* | 8/2020 | Martinez | H01B 13/01263 |

FOREIGN PATENT DOCUMENTS

| | | | | |
|---|---|---|---|---|
| DE | 102019107104 | A1 * | 10/2019 | F16B 5/0685 |
| EP | 0666628 | A1 | 8/1995 | |
| EP | 2740962 | A2 | 6/2014 | |
| EP | 3002495 | A1 | 4/2016 | |
| EP | 3124844 | A1 * | 2/2017 | F16L 55/035 |
| EP | 3809547 | A1 * | 4/2021 | F16L 3/221 |
| GB | 2436641 | A1 * | 3/2007 | |
| JP | 09317946 | A * | 12/1997 | F16L 55/035 |
| WO | WO-20140158437 | A1 * | 2/2014 | |

OTHER PUBLICATIONS

ARaymond automotive preferred products catalog (Year: 2019).*
AMZ automotive cable clip sold on amazon first available date: Aug. 2010 https://www.amazon.com/Clipsandfasteners-lnc-Latch-Compatible-10150076/dp/B07MK9N9TQ (Year: 2010).*

* cited by examiner

RETAINERS FOR ELONGATED MEMBERS IN VEHICLES

TECHNICAL FIELD

The present disclosure relates to retainers that receive and orient elongated members (e.g., cables, wires, rods, etc.) in vehicles. More specifically, the present disclosure relates to retainers including structure that inhibits (if not entirely prevents) the incorrect positioning of an elongated member between adjacent receptacles of the retainers.

BACKGROUND

Modern vehicles include a variety of cables, wires, rods, and other such elongated members that support a variety of functions (e.g., the locking and unlocking of doors, the communication of electrical signals, etc.). These elongated members are often held in place using a retainer (e.g., a clip, a bracket, or the like) with one or more receptacles for the elongated members. Known retainers, however, lend themselves to the incorrect positioning of elongated members between adjacent receptacles. The incorrectly positioned elongated member(s) often free themselves from the retainer over time, which can result in rattle, damage to the elongated member(s), and other such issues.

To address this concern, the present disclosure describes an improved retainer that inhibits (if not entirely prevents) the incorrect positioning of an elongated member between the receptacles of the retainer.

SUMMARY

In one aspect of the present disclosure, a retainer is disclosed that is configured to receive at least one elongated member in a vehicle. The retainer includes a body and first and second receptacles that are supported by the body. The first receptacle defines a first channel that is configured to receive a first elongated member (e.g., a cable, a wire, a rod, etc.) and includes a first finger that extends towards the second receptacle. The second receptacle defines a second channel that is configured to receive a second elongated member and includes a second finger that extends towards the first receptacle.

In certain embodiments, the first finger and the second finger may be formed as discrete structures so as not to interfere with flexure of the first receptacle and the second receptacle during insertion and removal of the first elongated member and the second elongated member.

In certain embodiments, the first finger may be formed integrally with the first receptacle and the second finger may be formed integrally with the second receptacle.

In certain embodiments, the first receptacle and the second receptacle may each define a first wall thickness, and the first finger and the second finger may each define a second wall thickness that is (approximately, substantially) equivalent to the first wall thickness.

In certain embodiments, the first finger and the second finger may be arranged in crosswise relation.

In certain embodiments, the first finger and the second finger may define a space therebetween.

In certain embodiments, the first receptacle and the second receptacle may each define opposing first and second ends.

In certain embodiments, the first finger may extend from the first end of the first receptacle and the second finger may extend from the second end of the second receptacle.

In certain embodiments, the first finger and the second finger may each define a free terminal end to allow for relative movement between the first finger and the second finger.

In certain embodiments, the first finger may extend from the first receptacle at a first angle and the second finger may extend from the second receptacle at a second angle.

In certain embodiments, the first angle and the second angle may be (approximately, substantially) equivalent.

In certain embodiments, the first angle and the second angle may be acute.

In certain embodiments, the body may include a platform supporting the first receptacle and the second receptacle In certain embodiments, the first angle may be defined by a first axis extending through the first finger and intersecting a plane extending in generally parallel relation to the platform and the second angle may be defined by a second axis extending through the second finger and the plane.

In another aspect of the present disclosure, a retainer is disclosed that is configured to receive at least one elongated member (e.g., a cable, a wire, a rod, etc.) in a vehicle. The retainer includes first and second receptacles that are each configured to receive an elongated member and at least one finger that extends from the first receptacle towards the second receptacle. The first and second receptacles define a gap therebetween to allow for flexure of the first and second receptacles. The at least one finger obstructs the gap defined between the first and second receptacles to inhibit receipt of the elongated member within the gap.

In certain embodiments, the first receptacle, the second receptacle, and the at least one finger may each define an (approximately, substantially) equivalent wall thickness.

In certain embodiments, the at least one finger may include a first finger that extends from the first receptacle towards the second receptacle and a second finger that extends from the second receptacle towards the first receptacle.

In certain embodiments, the first finger and the second finger may each define a free terminal end to allow for relative movement between the first finger and the second finger.

In certain embodiments, the first finger and the second finger may be arranged in overlapping relation along an axis that extends in generally parallel relation to channels defined by the first and second receptacles.

In another aspect of the present disclosure, a method of securing at least one elongated member (e.g., a cable, a wire, a rod, etc.) in a vehicle is disclosed. The method includes inserting a first elongated member into a first receptacle of a retainer and inserting a second elongated member into a second receptacle of the retainer. The retainer includes fingers that are arranged in crosswise relation so as to inhibit positioning one or more of the first elongated member and the second elongated member between the first receptacle and the second receptacle.

In certain embodiments, inserting the first elongated member into the first receptacle may include guiding the first elongated member into a mouth of the first receptacle via engagement (contact) with a first finger extending from the first receptacle towards the second receptacle and inserting the second elongated member into the second receptacle may include guiding the second elongated member into a mouth of the second receptacle via engagement (contact) with a second finger extending from the second receptacle towards the first receptacle.

In certain embodiments, inserting the first elongated member into the first receptacle may include expanding the first receptacle and inserting the second elongated member into the second receptacle may include expanding the second receptacle.

In certain embodiments, expanding the first receptacle may include deflecting the first finger towards the second receptacle and expanding the second receptacle may include deflecting the second finger towards the first receptacle.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes various embodiments and implementations of a retainer that is configured to receive one or more elongated members in a vehicle. Although generally described illustrated as a cable (or other such flexible member), it should be appreciated that the retainers described herein may be utilized in connection with a variety of elongated members, both flexible and rigid, such as, for example, electrical wiring, rods, and the like.

The retainers described herein include a plurality of receptacles (e.g., two or more) that are each configured to receive an elongated member. To inhibit (if not entirely prevent) the improper positioning of an elongated member within a gap defined between the receptacles, the retainers described herein also include one or more fingers that extends from the first receptacle towards the second receptacle so as to obstruct the gap.

Figure 1:
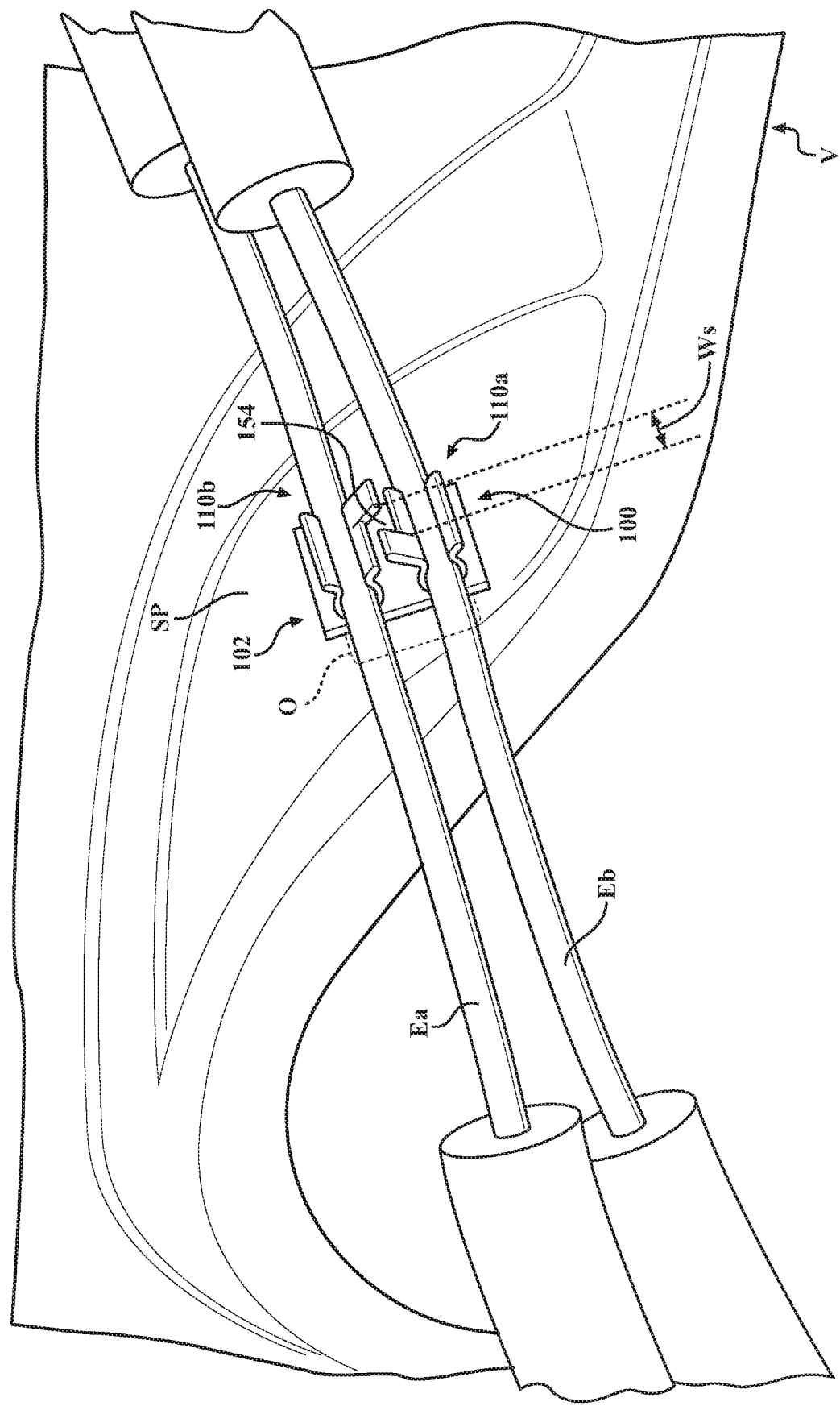
FIG. 1 is a top, perspective view of a retainer according to the principles of the present disclosure shown with two elongated members (e.g., cable, wires, etc.).
Figure 2:
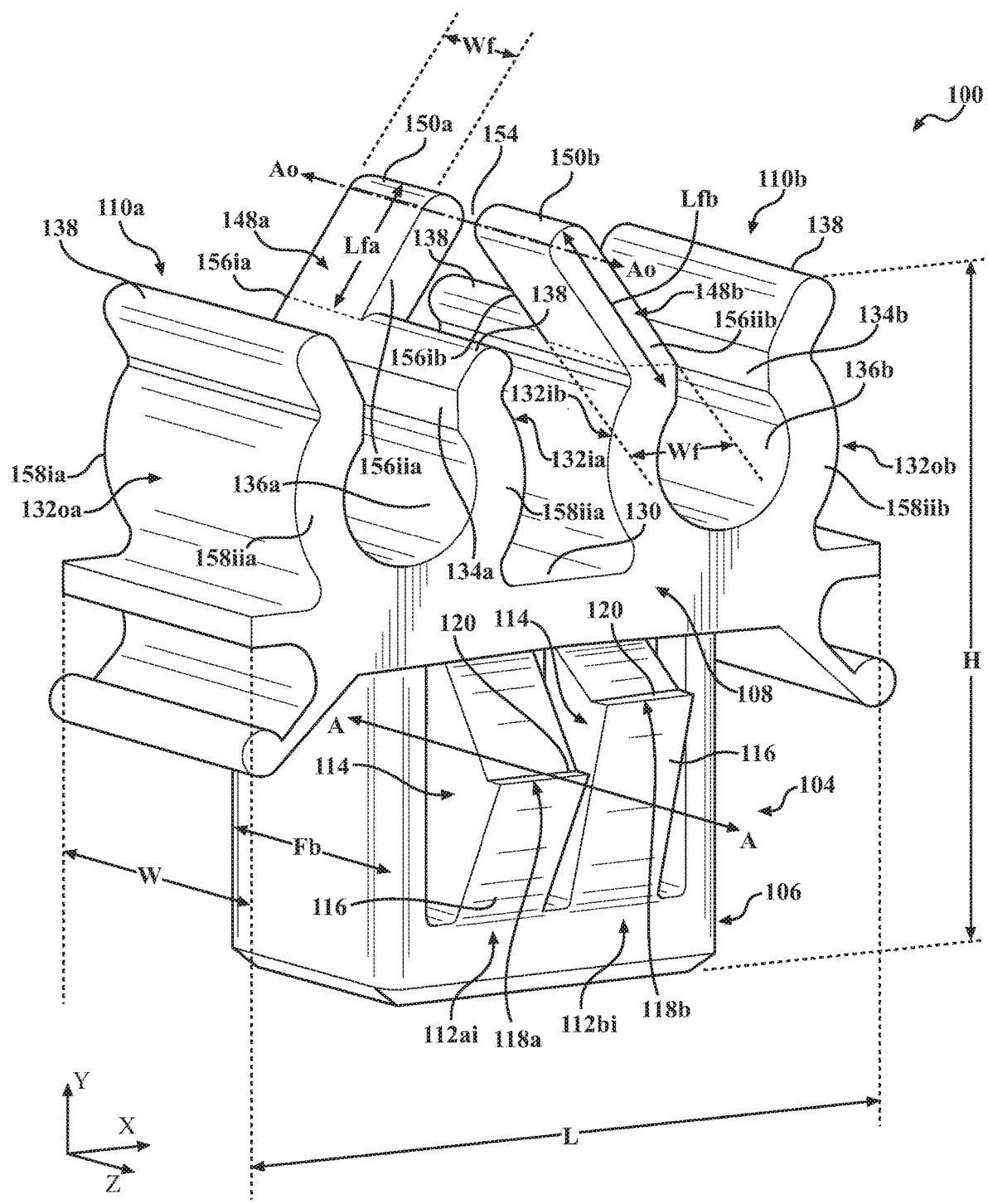
FIG. 2 is a side, perspective (rear) view of the retainer seen in FIG. 1.
Figure 3:
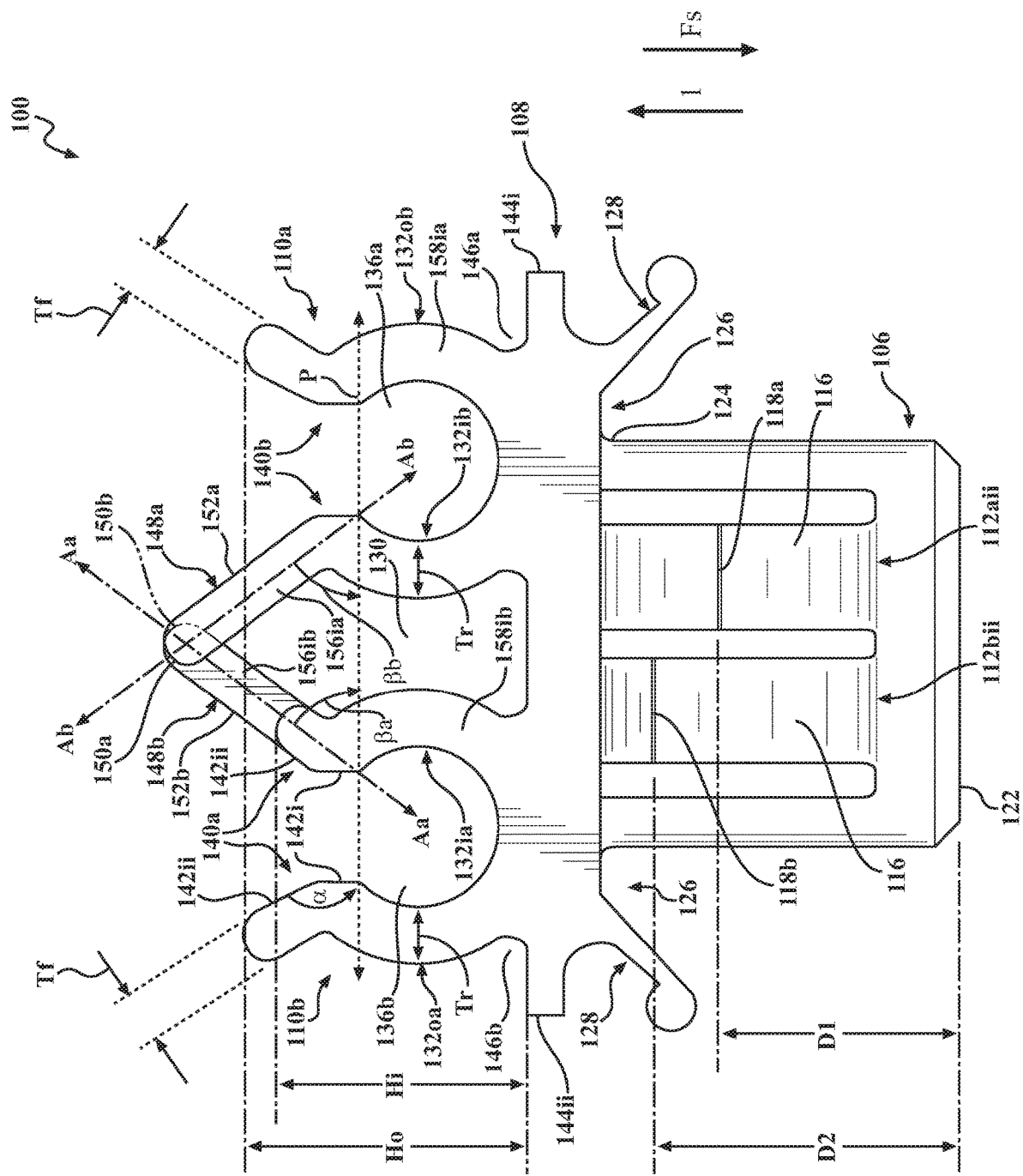
FIG. 3 is a (forward) end, plan view of the retainer seen in FIG. 1.

With reference to FIGS. 1-3, a retainer 100 (e.g., a clip 102) is illustrated together with a plurality of elongated members Ea, Eb in a vehicle V. Although generally illustrated as a cable (e.g. for locking and unlocking the doors of the vehicle V), it should be appreciated that the particular configuration, use, and/or number of the elongated members E may be varied without departing from the scope of the present disclosure and that the elongated member(s) E may be either rigid or non-rigid in construction. For example, it is envisioned that the elongated member(s) E may include electrical wiring, rods, or the like.

The retainer 100 defines an overall length L that extends along a first (e.g., horizontal) axis X and lies substantially within the range of approximately 16 mm to approximately 20 mm, an overall width W that extends along a second axis Z and lies substantially within the range of approximately 7 mm to approximately 11 mm, and an overall height H that extends along a third (e.g., vertical) axis Y and lies substantially within the range of approximately 12 mm to approximately 16 mm. It should be appreciated, however, that the specific dimensions of the retainer 100 may be altered in various embodiments (e.g., based upon the spatial requirements or the style of the vehicle V, the nature and/or function of the elongated member(s) E, etc.) and that a retainer 100 including an overall length L, an overall width W, and/or an overall height H outside the aforementioned ranges would not be beyond the scope of the present disclosure.

The retainer 100 may include any suitable material or combination of materials and may be formed through any suitable method of manufacture (e.g., injection molding, 3-D printing, laser machining, etc.). In the particular embodiment of the disclosure illustrated throughout the figures, for example, the retainer 100 includes (e.g., is formed partially or entirely from) a resilient material, such as polyoxymethylene (POM), which allows the retainer 100 to flex during insertion and removal of the elongated members E, as described hereinbelow.

The retainer 100 includes a body 104 with a base 106 and a platform 108, and a plurality of receptacles 110 that are supported by the body 104. Although shown as being integrally (e.g., monolithically) formed in the illustrated embodiment, it is also envisioned that one or more components of the retainer 100 may be formed separately and connected together. For example, it is envisioned that the body 104 and the receptacles 110 may be formed as separate, discrete components that may be connected via adhesive, through the use of mechanical fasteners, via sonic welding, etc.

The base 106 removably secures the retainer 100 within an opening O (FIG. 1) in the vehicle V (e.g., in a sheet metal panel SP) and may be configured in any manner suitable for this intended purpose. For example, the base 106 may be configured to secure the retainer 100 to the vehicle V via an interference fit, a press-fit, a snap-fit, or other such mechanical engagement. Although shown as including a generally polygonal (e.g., rectangular or square) transverse (e.g., horizontal) cross-sectional configuration in the embodiment of the retainer 100 seen in FIGS. 1-3, it should be appreciated that the particular configuration of the base 106 may be varied without departing from the scope of the present disclosure, an example of which is discussed hereinbelow.

To facilitate secured engagement of the retainer 100 to the vehicle V, in the illustrated embodiment, the base 106 includes one or more anchors 112 (e.g., deflectable tabs 114) that are movable into and out of the base 106 along an axis A during installation and removal of the retainer 100 (e.g., during insertion of the base 106 into the opening O and removal of the base 106 from the opening O). In certain embodiments, such as that seen in FIGS. 1-3, the retainer 100 includes one or more (internal) biasing members (not shown) (e.g., springs or the like) that are connected to the anchors 112 such that (inward) deflection of the anchors 112 compresses the biasing member(s) to thereby create (outwardly directed) biasing forces Fb that return the anchors 112 to their initial (normal) position (FIG. 2) upon the removal of an external force (e.g., the force applied to the anchors 112 by the sheet metal panel SP during insertion of the base 106 into the opening O).

In the embodiment seen in FIGS. 1-3, the base 106 includes a pair of first anchors 112*ai*, 112*aii* that extend in opposing (e.g., forward and rearward) directions and a pair of second anchors 112*bi*, 112*bii* that extend in opposing (e.g., forward and rearward) directions. Each anchor 112 defines an (outer) bearing surface 116 and a contact member 118 (e.g., a tooth 120). The bearing surfaces 118 are configured for engagement (contact) with the vehicle V (e.g., the sheet metal panel SP) and taper outwardly to facilitate inward deflection of the anchors 112 in the manner described herein. The contact members 118 are configured for engagement with the vehicle V adjacent to the opening O (e.g., with an inner surface of the sheet metal panel SP) upon complete insertion of the base 106 within the opening O and return of the anchors 112 to the initial position to thereby secure the retainer 100 to the vehicle V.

As seen in FIGS. 2 and 3, the anchors 112*a* differ in configuration from the anchors 112*b* in the vertical location of the corresponding contact members 118*a*, 118*b*, which facilitates use of the retainer 100 with a variety of vehicles V in which the particular thickness of the material adjacent to the opening O (e.g., the thickness of the sheet metal panel SP) may vary to thereby increase the usability and versatility of the retainer 100. For example, in the illustrated embodiment, the anchors 112*a* are configured such that the contact members 118*a* are positioned at a first vertical location that is spaced a first distance D1 (FIG. 3) from a lower (bottom) end 122 of the base 106 (e.g., to facilitate use with a material thickness substantially within the range of approximately 1.4 mm to approximately 1.7 mm) and the anchors 112*b* are configured such that the contact members 118*b* are positioned at a second, different vertical location that is spaced a second distance D2 from the lower end 122 of the base 106 (e.g., to facilitate use with a material thickness substantially within the range of approximately 0.4 mm to approximately 0.7 mm).

The platform 108 is positioned at an upper (top) end 124 of the base 106 and supports the receptacles 110. The platform 108 includes a generally planar (e.g., plate-like) configuration and extends radially outward from the base 106 to define one or more overhangs 126 (FIG. 3) that are configured for engagement with the vehicle V adjacent to the opening O to stabilize the retainer 100.

In the illustrated embodiment, the overhangs 126 include one or more stabilizers 128 that are configured to urge the retainer 100 outwardly away from the vehicle V upon insertion of the base 106 into the opening O. More specifically, upon insertion of the base 106 into the opening O, the stabilizers 128 are compressed (deflected) in the direction indicated by arrow 1, which creates an (outwardly directed) force Fs in the direction indicated by arrow 2 that maintains tension between the base 106 (e.g., the anchors 112) and the vehicle V (e.g., the sheet metal panel SP), thereby stabilizing the retainer 100 and enhancing securement of the retainer 100 within the opening O.

With continued reference to FIGS. 1-3, the receptacles 110 will be discussed. In the particular embodiment seen in FIGS. 1-3, the retainer 100 includes a pair of receptacles 110*a*, 110*b* that are positioned in adjacent relation so as to define a gap 130 therebetween, which allows for flexure of the receptacles 110 during insertion and removal of the elongated members E (FIG. 1), as described in further detail below. It should be appreciated, however, that the specific number of receptacles 110 may be increased without departing from the scope of the present disclosure, as discussed below.

Each receptacle 110 includes a pair of arms 132 (e.g., an outer arm 132*o* and an inner arm 132*i*) that extend (e.g., vertically upward) from the platform 108 so as to define a mouth 134. The mouth 134 opens into a channel 136 that is configured to receive a corresponding elongated member E such that the elongated members E extend through the receptacles 110, as seen in FIG. 1. To reduce friction between the receptacles 110 and the elongated members E and guide the elongated members E into the channels 136 during insertion, it is envisioned that each of the arms 132 may include a radiused end 138.

In the illustrated embodiment, the receptacles 110 are configured such that the (outer) arms 132*o* each define a (first) height Ho (FIG. 3) and the (inner) arms 132*i* each defines a (second) height Hi that is less than the height Ho (e.g., to increase the allowed flexure of the receptacles 110 during insertion and removal of the elongated members E). It should be appreciated, however, that the particular configuration of the receptacles 110 may be varied in alternate embodiments without departing from the scope of the present disclosure. For example, embodiments in which the heights Ho, Hi are (approximately, substantially) equivalent are contemplated herein, as are embodiments in which the height Hi may exceed the height Ho (e.g., to reduce the allowed flexure of the receptacles 110 during insertion and removal of the elongated members E).

In certain embodiments, such as those shown throughout the figures, to further facilitate reception of the elongated members E by the receptacles 110, each of the arms 132 may define guiding surfaces 140 (FIG. 3) that are configured to direct the elongated members E into the channels 136. More specifically, in the particular embodiment illustrated, the guide surfaces 140 each include a (first) segment 142*i* that is oriented in (generally) parallel relation to the axis Y (FIG. 2) and a (second) segment 142*ii* that extends from the (first) segment 142*i* so as to subtend an (obtuse) angle α therebetween.

While the receptacles 110 are configured such that the channels 136 extending therethrough are oriented in (generally) parallel relation to the axis Z and in (generally) orthogonal relation to each of the axes X, Y in the embodiment seen in FIGS. 1-3, it should be appreciated that the particular configuration of the receptacles 110 may be varied in alternate embodiments such that the channels 136 are oriented in any desired manner. For example, it is envisioned that the receptacles 110 may be configured such that channels 136 extend at an (acute) angle in relation to the axis Z.

In the embodiment seen in FIGS. 1-3, the receptacles 110 are inset on the platform 108 such that the (outer) arms 132*o* thereof are spaced inwardly from lateral ends 144*i*, 144*ii* of the platform 108 (e.g., along the axis X) so as to define reliefs 146*a*, 146*b* (FIG. 3). It is also envisioned, however, that the receptacles 110 may be positioned on the platform 108 such that the (outer) arms 132*o* are (generally) aligned with the lateral ends 144*i*, 144*ii* of the platform 108, respectively, so as to eliminated the reliefs 146*a*, 146*b*.

The receptacles 110 include corresponding fingers 148 that are arranged in crosswise relation. More specifically, the receptacle 110*a* includes a finger 148*a* that extends from the arm 132*ia* along a (first) axis Aa (FIG. 3) towards the receptacle 110*b* (e.g., the arm 132*ib*) to define a length Lfa (FIG. 2) and the receptacle 110*b* includes a finger 148*b* that extends from the arm 132*ib* along a (second) axis Ab (FIG. 3) towards the receptacle 110*a* (e.g., the arm 132*ia*) to define a length Lfb (FIG. 2). More specifically, the fingers 148*a*, 148*b* extend from the receptacles 110*a*, 110*b* at respective (first and second) angles βa, βb that are defined by the axes Aa, Ab and a plane P that intersects the axes Aa, Ab and extends in (generally) parallel relation to the platform 108.

In the illustrated embodiment, the angles βa, βb are acute and (approximately, substantially) equivalent. For example, it is envisioned that each of the angles βa, βb may lie substantially within the range of approximately 30° to approximately 60°. It should be appreciated, however, that the angles βa, βb may be varied in alternate embodiments without departing from the scope of the present disclosure and that the respective lengths Lfa, Lfb of the fingers 148a, 148b may be altered accordingly. For example, in embodiments where the angles βa, βb are reduced (e.g., embodiments where the angles βa, βb are more acute), the lengths Lfa, Lfb may be correspondingly lessened.

The fingers 148a, 148b are formed integrally with the receptacles 110a, 110b and overlap along an axis Ao (FIG. 2) that extends in (generally) parallel relation to the channels 136a, 136b respectively defined by the receptacles 110a, 110b (and the axis Z). To inhibit (if not entirely prevent) interference with reception of the elongated members E (FIG. 1) by the receptacles 110, however, the fingers 148a, 148b are configured such that they do not extend beyond one another. For example, as can be appreciated through reference to FIGS. 2 and 3, the finger 148a defines a (free) terminal end 150a that is coextensive (e.g., coplanar) with an inner surface 152b of the finger 148b and the finger 148b defines a terminal end 150b that is coextensive (e.g., coplanar) with an inner surface 152a of the finger 148a.

The crosswise, overlapping orientation of the fingers 148a, 148b obstructs the gap 130 defined between the receptacles 110a, 110b so as to inhibit (if not entirely prevent) improper positioning of the elongated members E (FIG. 1) between the receptacles 110a, 110b. In addition to frustrating insertion of the elongated members E into the gap 130, the configuration and orientation of the fingers 148a, 148b guides the elongated members E into the mouths 134a, 134b and the channels 136a, 136b defined by the receptacles 110a, 110b (e.g., via engagement (contact) with the guiding surfaces 140a, 140b), respectively. Moreover, the fingers 148a, 148b provide tactile surfaces that facilitate the application of (manual) force to the receptacles 110a, 110b, which allows the fingers 148a, 148b to be utilized as levers to assist expansion of the receptacles 110a, 110b and aid insertion and/or removal of the elongated members E, as described in further detail below.

The fingers 148a, 148b are configured as separate, discrete structures that are devoid of any direct connection so as not to interfere with flexure of the receptacles 110a, 110b during insertion and removal of the elongated members E. More specifically, the fingers 148a, 148b define a space 154 (FIGS. 1, 2) therebetween that extends in (generally) parallel relation to the channels 136a, 136b (and the axis Z). The space 154 allows for movement of the finger 148a relative to the receptacle 110b (and the finger 148b) as the receptacle 110a flexes (e.g., expands and contracts) during insertion and removal of the elongated member Ea and movement of the finger 148b relative to the receptacle 110a (and the finger 148a) as the receptacle 110b flexes (e.g., expands and contracts) during insertion and removal of the elongated member Eb.

The fingers 148 each define a (first) wall thickness Tf (FIG. 3) that is (approximately, substantially) equivalent to a (second) wall thickness Tr defined by the receptacles 110 (e.g., the arms 132) and a width Wf (FIG. 2) that extends in (generally) parallel relation to the overall width W of the retainer (and the axis Z). More specifically, in the particular embodiment of the disclosure seen in FIGS. 1-3, the width Wf of each finger 148 lies substantially within the range of approximately 25% to approximately 45% of the overall width W of the retainer 100 (e.g., approximately 3.5 mm), whereby the space 154 defines a width Ws (FIG. 1) that lies substantially within the range of approximately 10% to approximately 50% of the overall width W of the retainer 100 (e.g., approximately 2 mm).

Although the fingers 148 are illustrated as being generally linear in configuration throughout the figures, in alternate embodiments, it is envisioned that the fingers 148 may include a non-linear (e.g., curvate) configuration.

In the embodiment seen in FIGS. 1-3, the finger 148a extends from the receptacle 110a such that an outer (e.g., forward) wall 156ia (FIG. 2) thereof is coplanar with a first (forward) end 158ia of the receptacle 110a and the finger 148b extends from the receptacle 110b such that an outer (e.g., rear) wall 156ib (FIG. 3) thereof is coplanar with a second (rear), opposite end 158iib of the receptacle 110b. Alternatively, however, is envisioned that the finger 148a may extend from the receptacle 110a such that an inner (e.g., rear) wall $156_{iia}$ thereof is coplanar with a second (rear) end $158_{iia}$ of the receptacle 110a and that the finger 148b may extend from the receptacle 110b such that an inner (e.g., forward) wall 156ib thereof is coplanar with a second (rear) end $158_{iib}$ of the receptacle 110b.

Figure 4:
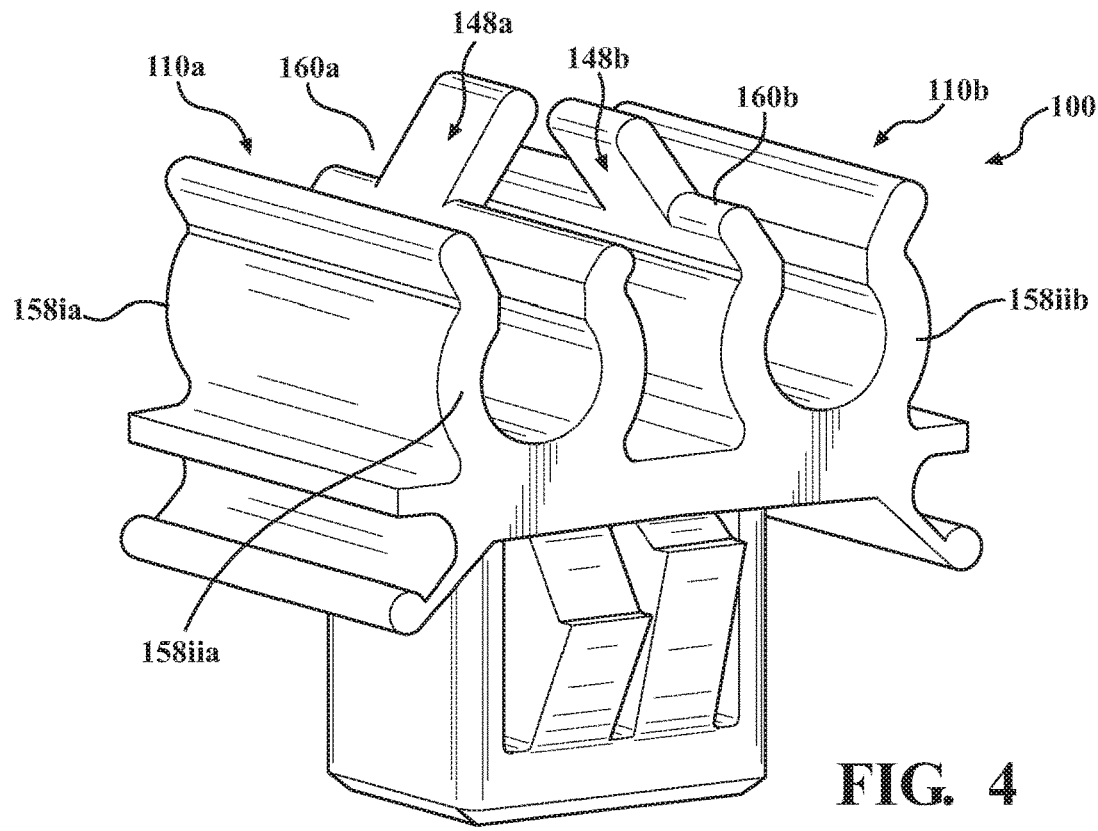
FIG. 4 is a side, perspective view of another alternate embodiment of the retainer seen in FIG. 1.

It is also envisioned that the fingers 148a, 148b may be inset and spaced from the respective ends 158ia, $158_{iib}$ of the receptacles 110a, 110b, as seen in FIG. 4. More specifically, the finger 148a may be spaced inwardly from the first (forward) end 158ia of the receptacle 110a (along the axis Z (FIG. 2)) so as to define a relief 160a and the finger 148b may be spaced inwardly from the second (rear) end 158iib of the receptacle 110b (along the axis Z (FIG. 2)) so as to define a relief 160b.

With reference again to FIGS. 1-3, use of the retainer 100 will be discussed in connection with the elongated members Ea, Eb. Initially, the retainer 100 is connected to the vehicle V (FIG. 1) via insertion of the base 106 into the opening O, whereby the anchors 112 are deflected (inwardly) (e.g., via engagement with sheet metal panel SP) such that the anchors 112ai, 112aii and the anchors 112bi, 112bii are deflected towards each other. Upon complete insertion of the base 106 into the opening O, the (outwardly directed) biasing forces Fb (FIG. 2) return the anchors 112a, 112b to their initial positions, seen in FIG. 2, whereby the contact members 118 are brought into engagement (contact) with the vehicle V (e.g., with an inner surface of the sheet metal panel SP) to thereby secure the retainer 100 within the opening O.

Following securement of the retainer 100 within the opening O, the elongated members Ea, Eb are inserted into the receptacles 110a, 110b, respectively. During insertion, the elongated members Ea, Eb are guided into the mouths 134a, 134b and, ultimately, into the channels 136a, 136b, by the fingers 148a, 148b and the guiding surfaces 140a, 140b, respectively. As seen in FIGS. 2 and 3, the overlapping, crosswise configuration of the fingers 148a, 148b inhibits, if not entirely prevents, improper insertion of the elongated members Ea, Eb into the gap 130 defined between the receptacles 110, 110b.

Insertion of the elongated members Ea, Eb into the receptacles 110a, 110b causes relative movement (e.g., deflection) of the arms 132oa, 132ia and the arms 132ob, 132ib to enlarge the mouths 134a, 134b and facilitate receipt of the elongated members Ea, Eb within the channels 136a, 136b, respectively, which is facilitated by the resilient material(s) included in construction of the retainer 100. More specifically, as the elongated members Ea, Eb engage (contact) the arms 132oa, 132ia and the arms 132ob, 132ib (e.g., the guiding surfaces 140), the arms 132oa, 132ia are moved (deflected) away from each other, as are the arms 132ob, 132ib, thereby expanding the receptacles 110a, 110b, respectively. During expansion of the receptacles 110a, 110*b*, as can be appreciated through reference to FIGS. 2 and 3, the finger 148*a* is deflected towards the receptacle 110*b* and the finger 148*b* is deflected towards the receptacle 110*a*.

As the elongated members Ea, Eb enter the channels 136*a*, 136*b*, respectively, the arms 132*oa*, 132*ia* and the arms 132*ob*, 132*ib* return to their initial (normal) positions (FIG. 1-3), which is again facilitated by the resilient material(s) included in construction of the retainer 100, thereby securing the elongated members Ea, Eb within the retainer 100.

When removal (disconnection) of the elongated members Ea, Eb is necessary or desired, the elongated members Ea, Eb can be withdrawn from the receptacles 110*a*, 110*b*, which causes relative movement (e.g., deflection) of the arms 132*oa*, 132*ia* and the arms 132*ob*, 132*ib* to thereby enlarge the mouths 134*a*, 134*b* and facilitate removal of the elongated members Ea, Eb from the channels 136*a*, 136*b*, respectively. More specifically, as the elongated members Ea, Eb are withdrawn from the receptacles 110*a*, 110*b*, the arms 132*oa*, 132*ia* are moved (deflected) away from each other, as are the arms 132*ob*, 132*ib*, which is again facilitated by the resilient material(s) included in construction of the retainer 100.

During insertion and removal of the elongated member Ea, Eb, is envisioned that additional force may be applied to the retainer via the fingers 148*a*, 148*b* (e.g., manually by a user). More specifically, a (first) force directed towards the receptacle 110*b* may be applied to the finger 148*a* and a (second) force directed towards the receptacle 110*a* may be applied to the finger 148*b* to thereby facilitate deflection of the arms 132*oa*, 132*ia* and the arms 132*ob*, 132*ib* and, thus, respective expansion of the receptacles 110*a*, 110*b*.

With reference now to FIGS. 5-9, additional embodiments of the retainer 100 will be discussed. Each of the embodiments discussed below is substantially similar to the retainer 100 and, thus, will only be described with respect to any differences therefrom in the interest of brevity.

Figure 5:
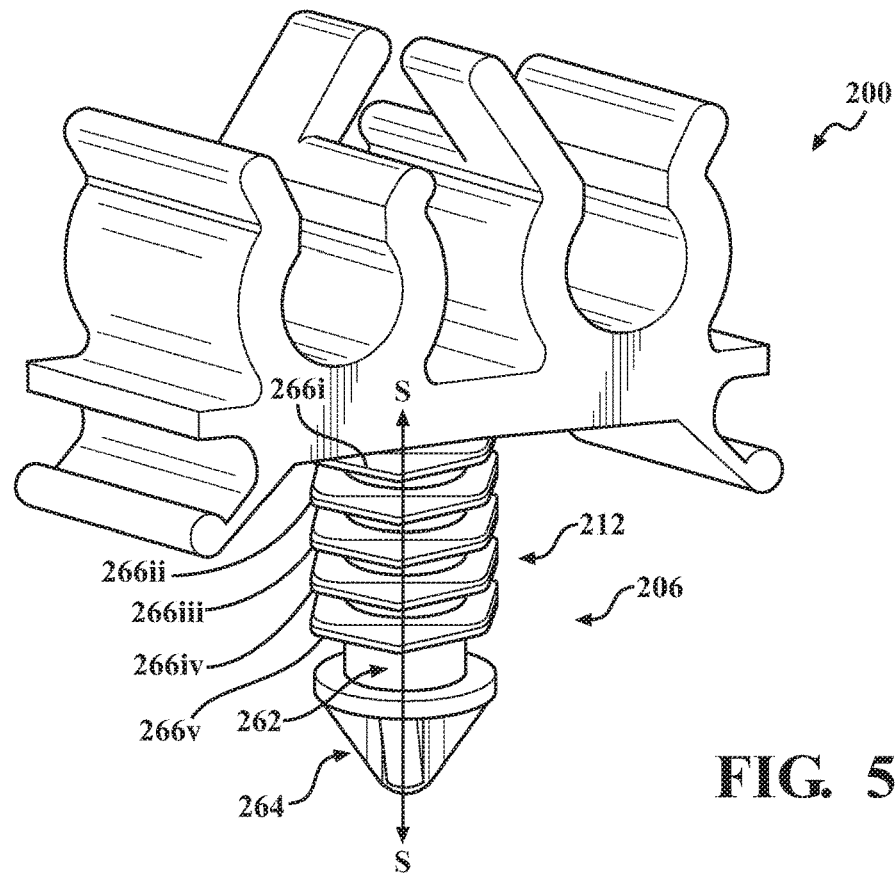
FIG. 5 is a side, perspective view of another alternate embodiment of the retainer seen in FIG. 1.

FIG. 5 illustrates a retainer 200 including a base 206 that is configured as a (generally annular) shaft 262 with a tapered end portion 264. The shaft 262 includes a plurality of anchors 212 that are configured as leaves 266. The leaves 266 extend radially outward from the shaft 262 such that the leaves 266 are deflectable along an axis S defined by the shaft 262. Although shown as including five (generally square-shaped) leaves 266*i*-266*iv* that are spaced axially (e.g., vertically) from each other along the length of the shaft 262, it is envisioned that the particular number and/or configuration of the leaves 266 may be varied in alternate embodiments of the disclosure.

Figure 6:
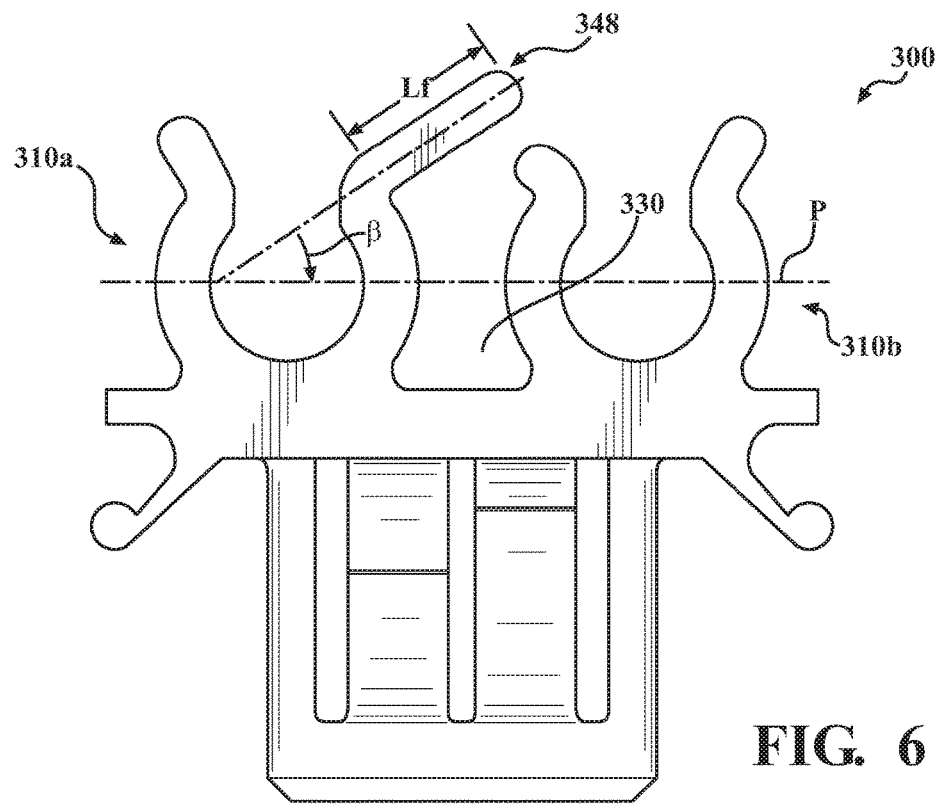
FIG. 6 is an end, plan view of an alternate embodiment of the retainer seen in FIG. 1.

FIG. 6 illustrates another embodiment of the retainer, which is identified by the reference character 300. As discussed in connection with the retainer 100, the retainer 300 includes a pair of adjacent receptacles 310*a*, 310*b* that define a gap 330 therebetween. In contrast to the retainer 100 (FIGS. 1-3), however, the retainer 300 includes a single finger 348 only that spans and obstructs the gap 330 so as to inhibit (if not entirely prevent) insertion of the elongated members E (FIG. 1) between the receptacles 310*a*, 310*b*. To facilitate proper obstruction of the gap 330, the finger 348 may define an increased length Lf (compared to the fingers 148 discussed above) and/or may extend at a reduced (e.g., more acute) angle β.

Although shown as extending from the receptacle 310*a* towards the receptacle 310*b* in the illustrated embodiment, it should be appreciated that the finger 348 may instead extend from the receptacle 310*b* toward the receptacle 310*a*.

Figure 7:
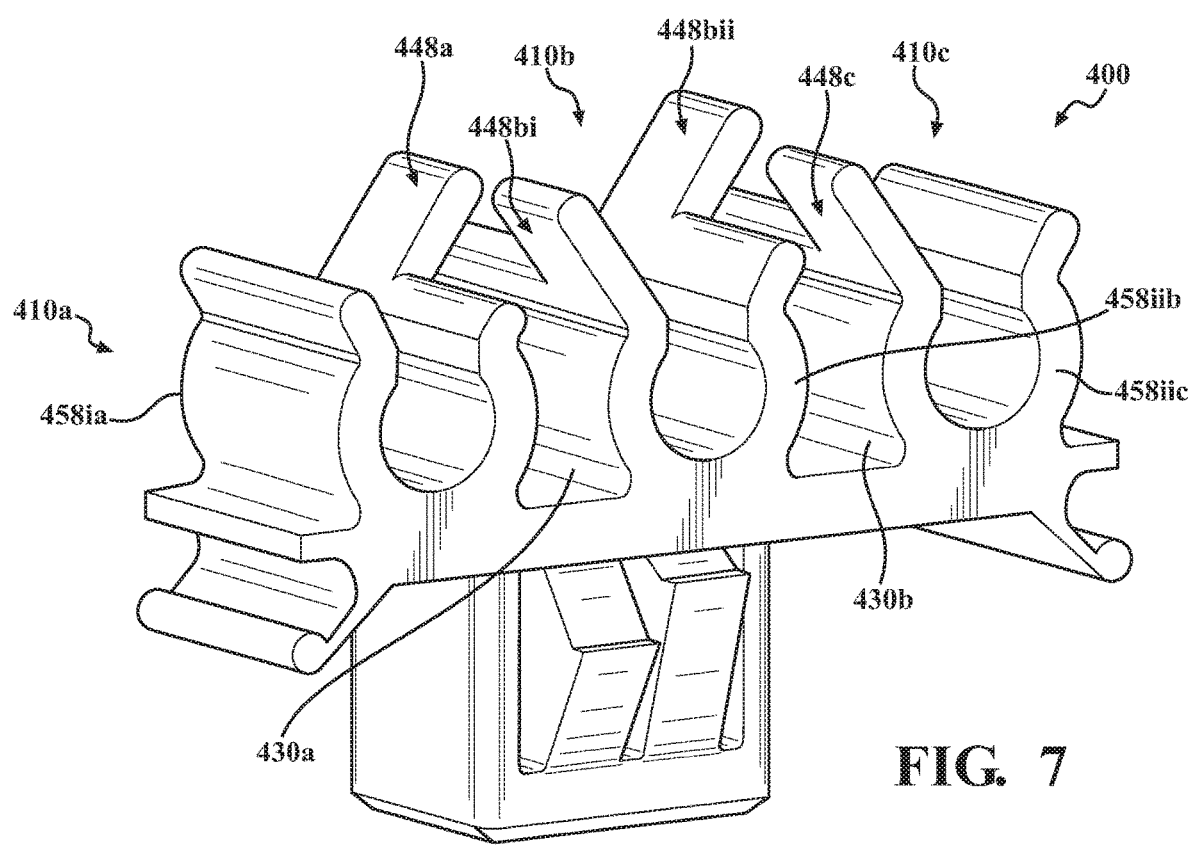
FIG. 7 is a side, perspective view of another alternate embodiment of the retainer seen in FIG. 1.
Figure 8:
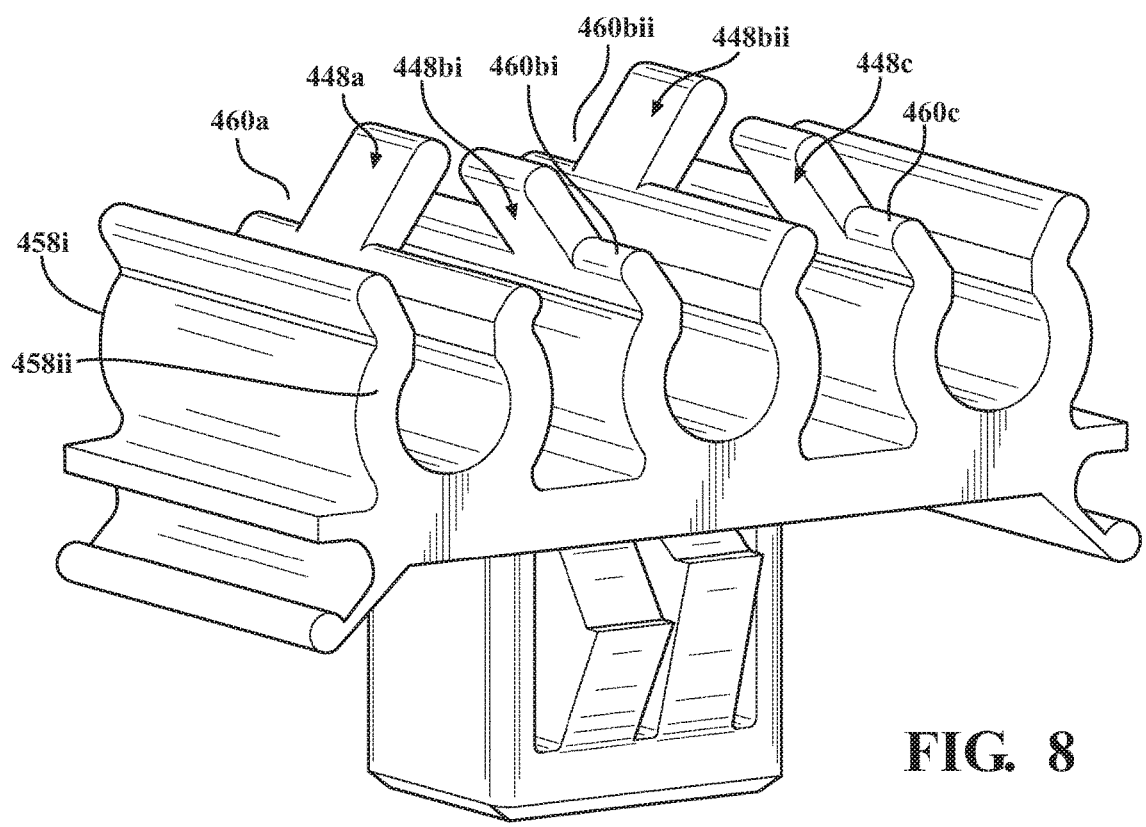
FIG. 8 is a side, perspective view of another alternate embodiment of the retainer seen in FIG. 1.

FIGS. 7 and 8 illustrate another embodiment of the retainer, which is identified by the reference character 400. In contrast to the retainer 100 (FIGS. 1-3), the retainer 400 includes three receptacles 410*a*, 410*b*, 410*c* that define a pair of gaps 430*a*, 430*b* therebetween. More specifically, the gap 430*a* is defined between the receptacles 410*a*, 410*b* and the gap 430*b* is defined between the receptacles 410*b*, 410*c*. It should be appreciated that additional receptacles 410 (e.g., a fourth receptacle, a fifth receptacle, etc.) are also contemplated herein.

The receptacle 410*a* includes a (first) finger 448*a* that extends towards the receptacle 410*b*, the receptacle 410*b* includes a (second) finger 448*bi* that extends towards the receptacle 110*a* and a (third) finger 448*bii* that extends towards the receptacle 410*c*, and the receptacle 410*c* includes a (fourth) finger 448*c* that extends towards the receptacle 410*b*. To inhibit (if not entirely prevent) improper positioning of the elongated member(s) E within the gaps 430*a*, 430*b*, the fingers 448*a*, 448*bi* and the fingers 448*bii*, 448*c* are configured in overlapping crosswise relation in the manner discussed above. Although the fingers 448*a*, 448*bii* are shown as being positioned in coplanar relation with outer walls 458*ia*, 458*ib* of the respective receptacles 410*a*, 410*b* and the fingers 448*bi*, 448*c* are shown as being positioned in coplanar relation with the outer walls 458*iib*, 458*iic* of the respective receptacles 410*b*, 410*c* in FIG. 7, it should be appreciated that the fingers 448*a*, 448*bi*, 448*bii*, 448*c* may be inset from the outer walls 458*i*, 458*ii* in alternate embodiments of the disclosure so as to define reliefs 460*a*, 460*bi*, 460*bii*, 460*c*, as seen in FIG. 8.

Figure 9:
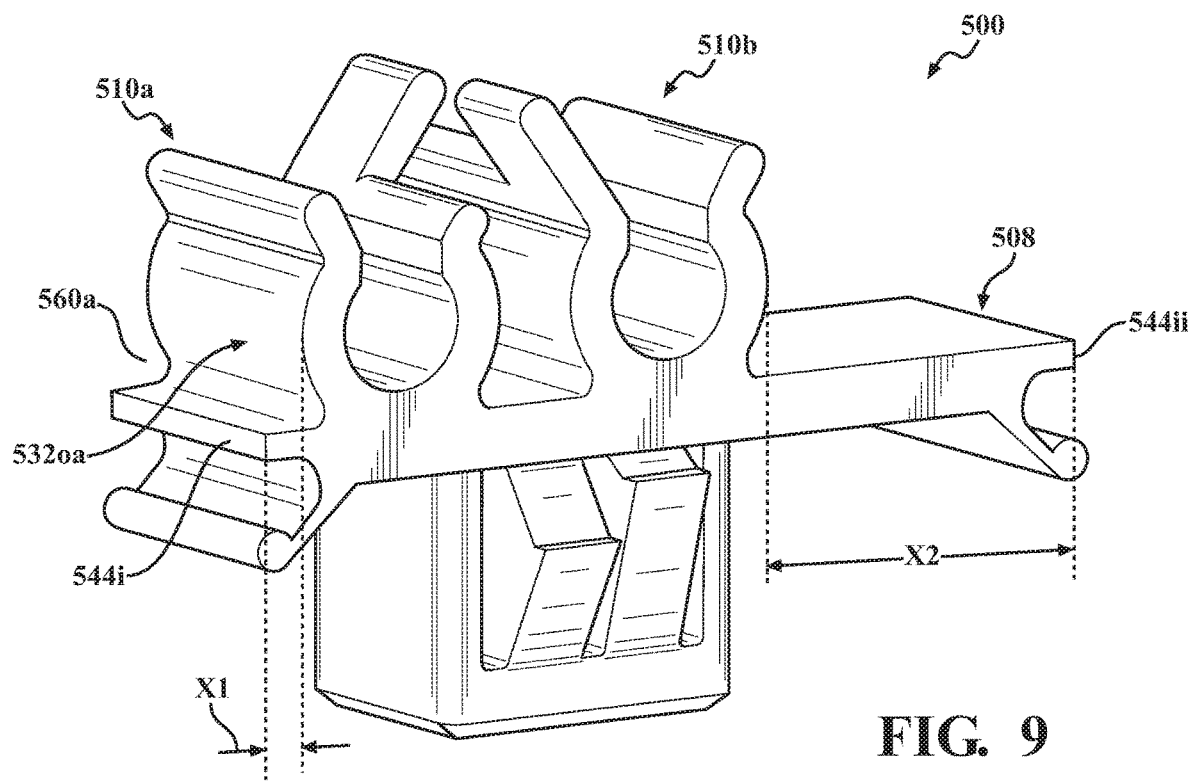
FIG. 9 is a side, perspective view of another alternate embodiment of the retainer seen in FIG. 1.

FIG. 9 illustrates another embodiment of the retainer, which is identified by the reference character 500. In contrast to the retainer 100 (FIGS. 1-3), in which the receptacles 110*a*, 110*b* are spaced (generally) equidistant from the lateral ends 144*i*, 144*ii* of the platform 108, the retainer 500 includes receptacles 510*a*, 510*b* that are supported by a platform 508 such that the receptacles 510*a*, 510*b* are spaced unequally from lateral ends 544*i*, 544*ii* thereof. More specifically, the receptacle 510*a* is spaced a (first) distance X1 from the lateral end 544*i* of the platform 508 and the receptacle 510*b* is spaced a (second) distance X2 from the lateral end 544*ii* of the platform 508. Although the retainer 500 is illustrated as being configured such that the distance X2 exceeds the distance X1 in the embodiment seen in FIG. 9, it should be appreciated instead that the retainer 500 may be configured such that the distance X1 exceeds the distance X2. Additionally, while the receptacle 510*a* is illustrated as being inset along the platform 508 so as to define a relief 560*a* in the embodiment seen in FIG. 9, it should be appreciated that the relief 560*a* may be eliminated without departing from the scope of the present disclosure (e.g., such that the arm 532*oa* of the receptacle 510*a* is (generally) aligned with the lateral ends 544*i* of the platform 508).

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A retainer configured to receive at least one elongated member in a vehicle, the retainer comprising:
    a body;
    a first receptacle defining a first channel configured to receive a first elongated member, the first receptacle including a first inner arm and a first outer arm, wherein the first inner arm and the first outer arm extend from the body; and
    a second receptacle defining a second channel discrete from the first channel and configured to receive a second elongated member, the second receptacle including a second inner arm and a second outer arm, wherein the second inner arm and the second outer arm extend from the body, the first receptacle including a first finger extending from the first inner arm towards the second receptacle and away from the body and the second receptacle including a second finger extending from the second inner arm towards the first receptacle and away from the body, the first finger and the second finger being formed as discrete structures so as not to interfere with flexure of the first receptacle and the second receptacle during insertion and removal of the first elongated member and the second elongated member, wherein the first receptacle and the second receptacle define a gap therebetween, the first finger and the second finger completely obstructing the gap so as to prevent positioning of the first elongate member or the second elongate member between the first receptacle and the second receptacle.

2. The retainer of claim 1, wherein the first finger is formed integrally with the first receptacle and the second finger is formed integrally with the second receptacle.

3. The retainer of claim 1, wherein the first receptacle and the second receptacle each define a first wall thickness and the first finger and the second finger each define a second wall thickness substantially equivalent to the first wall thickness.

4. The retainer of claim 1, wherein the first finger and the second finger are arranged in crosswise relation.

5. The retainer of claim 4, wherein the first finger and the second finger define a space therebetween.

6. The retainer of claim 5, wherein the first receptacle and the second receptacle each define opposing first and second ends, the first finger extending from the first end of the first receptacle and the second finger extending from the second end of the second receptacle.

7. The retainer of claim 5, wherein the first finger and the second finger each define a free terminal end to allow for relative movement between the first finger and the second finger.

8. The retainer of claim 1, wherein the first finger extends from the first receptacle at a first angle and the second finger extends from the second receptacle at a second angle.

9. The retainer of claim 8, wherein the first angle and the second angle are substantially equivalent.

10. The retainer of claim 9, wherein the first angle and the second angle are acute.

11. The retainer of claim 10, wherein the body includes a platform supporting the first receptacle and the second receptacle, the first angle being defined by a first axis extending through the first finger and intersecting a plane extending in generally parallel relation to the platform and the second angle being defined by a second axis extending through the second finger and the plane.

12. A retainer configured to receive at least one elongated member in a vehicle, the retainer comprising:
    first and second receptacles each configured to receive an elongated member, the first and second receptacles each including outermost walls collectively defining a gap therebetween to allow for flexure of the first and second receptacles; and
    at least one finger extending upwardly from the first receptacle along a vertical height of the retainer and towards the second receptacle, the at least one finger extending beyond the outermost wall of the first receptacle so as to obstruct the gap defined between the first and second receptacles to substantially prevent receipt of the elongated member within the gap.

13. The retainer of claim 12, wherein the first receptacle, the second receptacle, and the at least one finger each define a substantially equivalent wall thickness.

14. The retainer of claim 12, wherein the at least one finger includes a first finger extending directly upward from the first receptacle towards the second receptacle and a second finger extending directly upward from the second receptacle towards the first receptacle.

15. The retainer of claim 14, wherein the first finger and the second finger each define a free terminal end to allow for relative movement between the first finger and the second finger.

16. The retainer of claim 15, wherein the first finger and the second finger are arranged in overlapping relation along an axis extending in generally parallel relation to channels defined by the first and second receptacles.

17. A method of securing at least one elongated member in a vehicle, the method comprising:
inserting a first elongated member into a first receptacle of a retainer; and
inserting a second elongated member into a second receptacle of the retainer, the retainer including fingers extending upwardly from the first receptacle and the second receptacle, the fingers arranged in overlapping relation so as to inhibit positioning one or more of the first elongated member and the second elongated member between the first receptacle and the second receptacle.

18. The method of claim 17, wherein inserting the first elongated member into the first receptacle includes guiding the first elongated member into a mouth of the first receptacle via engagement with a first finger extending upwardly from the first receptacle and towards the second receptacle and inserting the second elongated member into the second receptacle includes guiding the second elongated member into a mouth of the second receptacle via engagement with a second finger extending upwardly from the second receptacle and towards the first receptacle.

19. The method of claim 18, wherein inserting the first elongated member into the first receptacle includes expanding the first receptacle and inserting the second elongated member into the second receptacle includes expanding the second receptacle.

20. The method of claim 19, wherein expanding the first receptacle includes deflecting the first finger towards the second receptacle and expanding the second receptacle includes deflecting the second finger towards the first receptacle.

* * * * *